United States Patent [19]

Breslin

[11] 4,070,586
[45] Jan. 24, 1978

[54] ELECTRIC VACUUM CLEANING AND AGITATOR MOTOR CONTROL SYSTEM

[75] Inventor: John J. Breslin, Los Altos, Calif.

[73] Assignee: Beamco, Inc., Mountain View, Calif.

[21] Appl. No.: 716,682

[22] Filed: Aug. 23, 1976

[51] Int. Cl.² ............................................ H01H 47/22
[52] U.S. Cl. .................................................... 307/22
[58] Field of Search ................. 307/22, 114, 112, 113, 307/18; 361/189, 139

[56] References Cited

U.S. PATENT DOCUMENTS 3,700,972  10/1972  Bates ..................................... 307/114

Primary Examiner—Herman Hohauser

[57] ABSTRACT

Electrical energization and control circuit particularly for use in permanently installed vacuum cleaning systems having a centrally located A.C. powered vacuum turbine and a remote flexible cleaning unit equipped with low voltage A.C. or D.C. agitator motors. Energization of the A.C. turbine motor circuit is controlled by a current sensor in the one of the two wires leading to the remote low voltage agitator motor so that a selector switch in the handle of the cleaning unit may, in one position, energize the low voltage agitator motor or, in a second position, bypass the agitator motor through a resistance to initiate a current flow that is sensed by the current sensor to activate the A.C. motor circuit.

10 Claims, 3 Drawing Figures

ELECTRIC VACUUM CLEANING AND AGITATOR MOTOR CONTROL SYSTEM

BACKGROUND OF THE INVENTION

The present invention relates to an improved electrical transmission and control system for use in a central vacuum cleaning system having a centrally located A.C. power turbine and one or more remote cleaning units equipped with low voltage agitator motors. A single pair of conductors interconnected between the central system and the remote unit permit the operator to switch on the agitator motor with the A.C. vacuum system, or to switch on the vacuum system only, by introducing through the wire pair a current flow that is sensed by a current sensor that, in turn, controls the power to the A.C. vacuum motor.

My U.S. Pat. No. 3,525,876, describes and claims a similar type of two-wire power transmission and control circuit which supplies low voltage D.C. power to an agitator motor and which uses a low voltage A.C. control circuit. While the circuit of that patent works satisfactorily, many problems, both physical and electrical, arose because major circuit components had to be constructed in the handle of the remote cleaning unit hose.

SUMMARY OF THE INVENTION

In the present invention, the handle of the cleaning unit hose contains only a simple single-pole double-throw switch with a center OFF position together with a small resistance which is used to draw a small current through the wire pair when it is desired to use the A.C. vacuum system without energizing the agitator motor. The wire pair, which is connected through a suitable receptacle associated with the vacuum hose receptacle, is coupled to a power source and the control circuitry which is preferably located at the opposite end of the vacuum cleaning airway at the centrally located A.C. powered vacuum turbine system. The control circuitry includes a current sensor which, upon sensing a current in the circuit to either the agitator motor or through the resistance located in the handle of the remote cleaning unit, activates circuitry that energizes the A.C. motor coupled to the vacuum turbine. Thus, the operator may energize the vacuum system by creating a current flow through the low voltage wire pair either by switching on the agitator motor, or by switching to the resistance that shunts the agitator motor.

BRIEF DESCRIPTION OF THE DRAWINGS

In the drawings that illustrate preferred embodiments of the invention.

DETAILED DESCRIPTION OF THE ILLUSTRATED EMBODIMENTS

Figure 1:
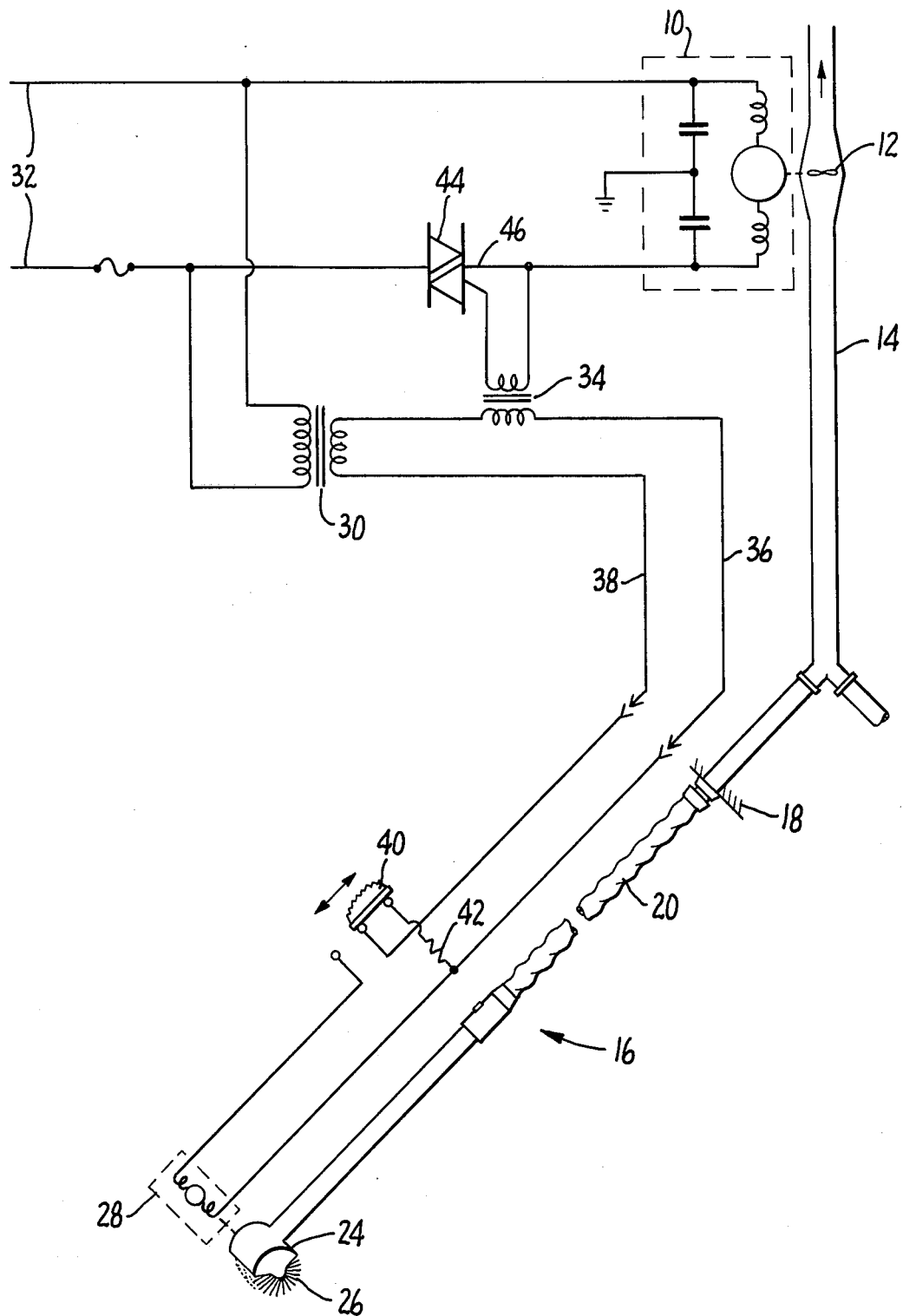
FIG. 1 is a circuit diagram illustrating the A.C. control circuitry and low voltage A.C. power transmission to the agitator motor.

Referring now to the drawings, FIG. 1 is a schematic diagram illustrating a preferred method of controlling an A.C. suction motor 10 mechanically coupled to an air turbine 12 in the vacuum airway 14 of a vacuum cleaning system that includes one or more remote flexible cleaning units 16 suitably coupled to the airway 14 through an outlet receptacle 18. Cleaning unit 16 typically includes a flexible vacuum hose 20 connected between receptacle 18 and a cleaning wand 22 having, at its lower end, a nozzle 24 containing a rotary brush 26 mechanically driven by an agitator motor 28. To reduce the possibility of injury to the operator, agitator motor 28 operates at a low voltage, typically 24 volts A.C.

The low voltage A.C. power for motor 28 is provided by a transformer 30, the primary of which is connected to the power input lines 32. One leg of the secondary side of the 24-volt transformer 30 is connected in series with the primary winding of a current sensing transformer 34 and through conductor 36 to one terminal of the agitator motor 28. The other leg of the secondary of transformer 30 is coupled through a conductor 38 to the center pole of a single-pole double-throw switch 40, which may be a sliding switch with a center OFF position. One pole of switch 40 is coupled to a terminal of the agitator motor 28, while the second pole of switch 40 is coupled through a low value resistance 42 to the conductor 36. Thus, when switch 40 is in its central or "OFF" position, no current will flow through the conductors 36 and 38. When the switch 40 connects the resistance 42 between conductors 36 and 38, thereby bypassing the motor 28, or when switch 40 connects the motor 28 to the conductor 38, current will flow through the conductors 36 and 38 and through the primary windings of the current sensing transformer 34.

The A.C. motor 10 driving the air turbine 12 is coupled to an A.C. power source through the power input lines 32. In series between the power source and the motor 10 is an A.C. switch which, in the embodiment illustrated in FIG. 1, comprises a triac 44 having its main terminals coupled in series between the power source and the motor 10 and having the gate terminal coupled to one leg of the secondary winding of the current sensing transformer 34. The opposite secondary leg of transformer 34 is connected in a conventional manner to the main terminal 46 of the triac 44.

In operation, the operator wishing to energize the A.C. motor 10 without the agitator 28, merely slides switch 40 so that the resistance 42 completes the circuit across conductors 36 and 38. A current then flows through the resistance 42 and the primary winding of the current sensing transformer 34. An A.C. voltage is induced into the secondary windings of transformer 34 and to the gate of the triac 44 which closes the A.C. circuit to energize the motor 10. When the operator wishes to activate the rotary brush 26, he merely slides switch 40 to the opposite contact to provide A.C. power to the agitator motor 28, so that current is again drawn through the primary winding of current sensing transformer 34 whereby the triac 44 is again activated to energize the A.C. motor 10.

Figure 2:
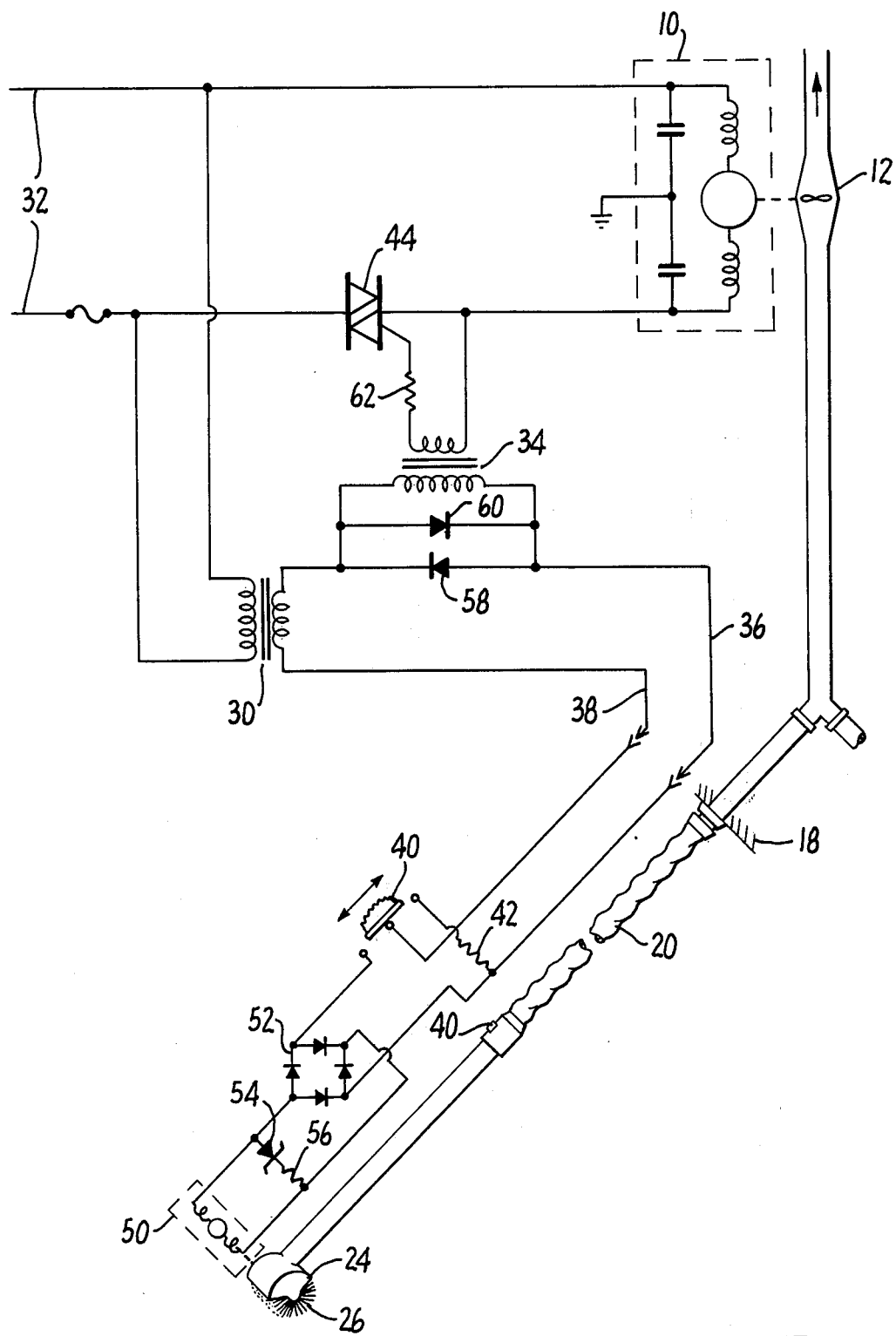
FIG. 2 is a schematic diagram illustrating a modified A.C. control circuitry and low voltage D.C. power transmission to the agitator motor; and, FIG. 3 is a circuit diagram illustrating circuitry for the D.C. control of the A.C. motor circuit and D.C. power transmission to the agitator motor.

FIG. 2 illustrates circuitry similar to that described in connection with FIG. 1 but employs several refinements for improving overall performance. In the circuitry of FIG. 2, the rotary brush 26 is driven by a D.C. motor 50 which normally provides more power than an A.C. motor and thereby provides greater brush efficiency. Power to motor 50 is provided by transformer 30 which transmits A.C. current through conductors 36 and 38 and through the switch 40 to a full wave diode bridge rectifier 52 which may be physically located within the nozzle 24 and adjacent the housing of motor 50. The voltage at transformer 30 and/or motor 50 may be selected so that a maximum torque is applied to the brush 26 during heavy loads. In order to prevent an overvoltage to motor 50 during light loads, a zener diode 54 in series with a low value resistance 56 may be coupled across the terminals of the motor 50. The zener diode 54 should be selected to bypass some of the D.C. current from the rectifier 52 when the voltage at the terminal of the motor 50 is excessive, such as during low or no-load operation of the motor. During heavy loads on motor 50, higher currents will be drawn, there will be a corresponding voltage drop through the circuit, the zener diode 54 will no longer conduct current, and greater D.C. power will be applied to the motor 50.

If high current is drawn by the D.C. motor 50, a corresponding high current will be drawn through the conductor 36 and the primary windings of the current sensing transformer 34. If the primary winding of transformer 34 introduces an excessive impedance drop through the circuit, the primary windings of transformer 34 may be shunted with a pair of oppositely connected parallel diodes 58 and 60 which serve to limit the voltage drop across the primary of the circuit sensing transformer 34, thereby applying more power through the rectifier 52 to the motor 50. Another circuit refinement is the addition of a suitable resistor 62 in the circuit between the gate of triac 44 and the secondary winding of transformer 34. Resistance 62 will serve to limit the current to the gate element of triac 44, thus reducing the possibility of damage to that element.

Figure 3:
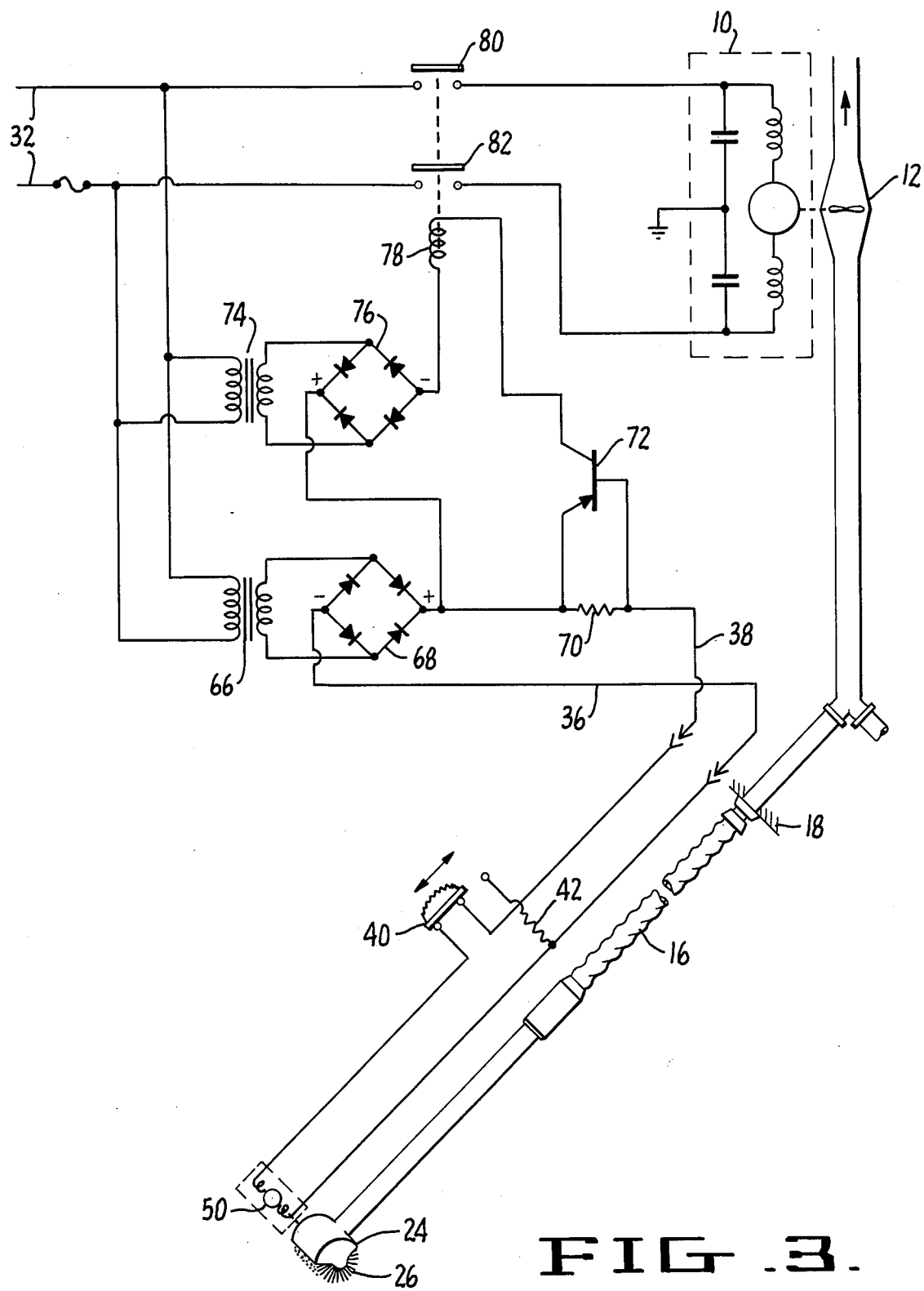

FIG. 3 is a schematic diagram illustrating circuitry for a D.C. control circuit and the transmission of power to a D.C. agitator motor. In the embodiment illustrated in FIG. 3, the D.C. power for driving the agitator motor 50 is provided by rectifier circuitry that is preferably located in the area adjacent the centrally located A.C. suction motor 10 and its associated air turbine 12. Therefore, in this embodiment, D.C. power is provided to the motor in the cleaning unit 16 through a suitable D.C. electrical outlet associated with the outlet receptacle 18.

A.C. power from the power input lines 32 is applied to the primary windings of the transformer 66, the secondary windings of which are connected to a full wave diode bridge rectifier 68. The negative terminal of the rectifier 68 is coupled through conductor 36 to one terminal of the D.C. agitator motor 50. The positive terminal of rectifier 68 is coupled through a low value resistance 70 and through conductor 38 to the center terminal of sliding switch 40, the operation of which has previously been described in connection with FIG. 1. Therefore, when the operator selects a position of switch 40 so that D.C. current is drawn through the circuit, a voltage drop will appear across the resistance 70. This voltage drop is monitored by the base-emitter circuit of the PNP transistor 72, the emitter of which is connected to the positive end of resistance 70 and the base of which is connected to the negative end.

Connected across the power input lines 32 is the primary windings of a transformer 74, the secondary windings of which are connected across a full wave diode bridge rectifier 76. The positive terminal of the bridge rectifier 76 is connected to the positive terminal of the bridge rectifier 68. The negative terminal of rectifier 76 is connected through windings 78 of a current sensitive solenoid to the collector of the transistor 72. Solenoid windings 78 are coupled to actuate normally open relay contacts 80 and 82 in series between the power input lines 32 and the A.C. motor 10.

In operation, when the switch 40 is moved from its OFF position, D.C. current from the rectifier 68 is drawn through the current sensing resistor 70 and the contacts of switch 40 to the D.C. motor 50, or the resistance 42. A voltage drop will be generated across the resistance 70 to switch on transistor 72, thereby passing a current through the transistor 72 and the solenoid windings 78 to the negative terminal of the rectifier 76. The current through windings 78 close the relay contacts 80 and 82 to apply A.C. current from the power input lines 32 to the A.C. suction motor 10.

Although several embodiments of the invention have been described, it should be understood that the invention is not intended to be limited to the specifics of these embodiments.

For example, even though the foregoing description refers to the circuits as being particularly for use in permanently installed vacuum cleaning systems having a centrally located AC power turbine and one or more remote cleaning units equipped with low voltage agitator motors, it should be understood that the circuits are also usable and intended for use with high voltage agitator motors and/or in portable vacuum cleaners wherein the power turbine is located in a portable canister and the electric motor driven agitator is located on a cleaning wand connected to the canister by a flexible conduit similar to that of the aforedescribed permanently installed vacuum cleaning systems. Accordingly, as used in the accompanying claims, reference to central electrical devices is intended to encompass both permanently installed central devices and portable central devices and reference to remote electrical devices, unless specifically defined otherwise, is intended to encompass high, as well as low, voltage devices.

What is claimed is:

1. A control system for selectively energizing and supplying power to a central and a remote electrical load device interconnected by a single conductor pair from a common control located at the remote device comprising:
   a. power means at the location of the central electrical device for providing electrical power to said central device and to the conductor pair interconnecting said central device with the remote electrical device;
   b. first switching means interposed between said power means and said central device for controlling the flow of electrical current to said central device;
   c. second switching means at the location of said remote device and interposed in one conductor of said pair for controlling the flow of electrical current to said remote device;
   d. detecting means at the location of said central device and interposed in one conductor of said pair of detecting an electrical current flow through said conductor pair; and
   e. actuating means responsive to said detecting means and coupled to said first switching means for actuating said first switching means in response to a current flow detected by said detecting means.

2. The control circuit claimed in claim 1 wherein said second switching means comprises a double-throw switch having a first position for conducting electrical current to said remote electrical device and a second position for conducting electrical current through a shunting path that bypasses said remote device.

3. A control system claimed in claim 2 wherein said power means provides A.C. electrical voltage to said conductor pair and wherein said detecting means comprises a current sensing transformer primary winding interposed in one of said pair.

4. The control system claimed in claim 3 wherein said first switching means comprises a triac and wherein said actuating means includes circuitry responsive to an electrical current sensed by said current sensing transformer primary winding for gating said triac into conduction.

5. The control system claimed in claim 3 further including a voltage rectifier located in the circuit between said remote electrical device and said second switching means for supplying D.C. power to said remote device.

6. The control system claimed in claim 2 wherein said power means provides D.C. electrical voltage to said conductor pair and wherein said detecting means comprises a resistor interposed in one of said pair.

7. The control system claimed in claim 6 wherein said first switching means comprises solenoid operated relay contacts and wherein said actuating means includes a semiconductor device coupled across said current detecting resistor and to the windings of said solenoid operated relay for actuating said relay in response to a voltage drop detected across said current detecting resistor.

8. A power transmission and control system for a central vacuum cleaning system having a centrally located electrical vacuum motor and at least one remote cleaning unit to be coupled to the vacuum system and carrying an agitator brush driven by a motor, said system comprising:
   a. a pair of conductors coupled to a source of electrical power at the location of the centrally located electrical vacuum motor and to the agitator motor in the remote cleaning unit;
   b. a double-throw switch positioned in the handle of said remote unit and coupled between one conductor of said pair of said agitator motor, one position of said switch for supplying electrical power to said motor and the second position of said switch for providing electrical continuity across said pair whereby said motor is shunted while current flows through said pair of conductors;
   c. a current sensor at the location of said centrally located vacuum motor and interposed in one conductor of said pair, said sensor generating a control voltage in response to a flow of current through said conductor pair;
   d. a power transmission line connecting said centrally located electrical vacuum motor to a source of electrical power; and,
   e. an electrically responsive power switch interposed in said power transmission line and coupled to said current sensor for actuation by the control voltage generated therein.

9. The system claimed in claim 8 wherein said current sensor comprises a transformer having the primary winding coupled into one conductor of said pair and wherein said power switch comprises a triac having the gate coupled to the secondary winding of said transformer.

10. The system claimed in claim 8 wherein said current sensor is a resistor coupled into one conductor of said pair and a semi-conductor coupled to become conductive in response to a voltage drop across said resistor, and wherein said power switch comprises a solenoid operated switch having its excitation winding coupled between said semiconductor and a D.C. electrical source.

* * * * *

REEXAMINATION CERTIFICATE (1375th)
United States Patent [19]
Breslin

[11] B1 4,070,586

[45] Certificate Issued Oct. 30, 1990

[54] ELECTRIC VACUUM CLEANING AND AGITATOR MOTOR CONTROL SYSTEM

[75] Inventor: John J. Breslin, Los Altos, Calif.

[73] Assignee: Beamco, Inc., Mountain View, Calif.

Reexamination Reqs:st:
No. 90/001,009, May 14, 1986
No. 90/001,218, Apr. 17, 1987

Reexamination Certificate for:
Patent No.: 4,070,586
Issued: Jan. 24, 1978
Appl. No.: 716,682
Filed: Aug. 23, 1976

[51] Int. Cl.⁵ .................................................. H02J 3/02
[52] U.S. Cl. ................................................... 307/22
[58] Field of Search ........................ 363/123; 307/142

[56] References Cited
U.S. PATENT DOCUMENTS

| | | | |
|---|---|---|---|
| 2,072,689 | 3/1937 | Smellie | 15/13 |
| 2,072,690 | 3/1937 | Smellie | 15/9 |
| 3,458,892 | 8/1969 | Kobayashi et al. | 15/327 |
| 3,525,876 | 8/1970 | Breslin | 307/22 |
| 3,579,706 | 5/1971 | Hetland | 15/327 |
| 3,588,943 | 6/1971 | Hetland | 15/327 |
| 3,700,972 | 10/1972 | Bates | 307/114 |
| 3,761,738 | 9/1973 | Kay et al. | 307/140 |
| 3,855,665 | 12/1974 | Schwartz | 15/339 |
| 4,021,879 | 5/1977 | Brigham | 15/319 |
| 4,357,729 | 11/1982 | Vander Molen et al. | 15/319 |

OTHER PUBLICATIONS

Walters, W. R. "A Triac Amplifier for Servo Control-Small Size, Low Cost and Low Power Drain", RCA Review 1968.
"Integrated Circuits and Semiconductor Devices: Theory and Application", pp. 465, 484–486, 500 & 503 (McGraw-Hill, Inc. 1971).
"The Semiconductor Data Book" (Motorola Inc. 1968).
"Section 10-5/Thyristors", pp. 354 & 355.
Howell, E. K. *Triac Control for AC Power*, May, 1964.
Galloway, J. H. *Using the Triac for Control of AC Power*, Mar., 1966.

*Primary Examiner*—William M. Shoop, Jr.

[57] ABSTRACT

Electrical energization and control circuit particularly for use in permanently installed vacuum cleaning systems having a centrally located A.C. powered vacuum turbine and a remote flexible cleaning unit equipped with low voltage A.C. or D.C. agitator motors. Energization of the A.C. turbine motor circuit is controlled by a current sensor in the one of the two wires leading to the remote low voltage agitator motor so that a selector switch in the handle of the cleaning unit may, in one position, energize the low voltage agitator motor or, in a second position, bypass the agitator motor through a resistance to initiate a current flow that is sensed by the current sensor to activate the A.C. motor circuit.

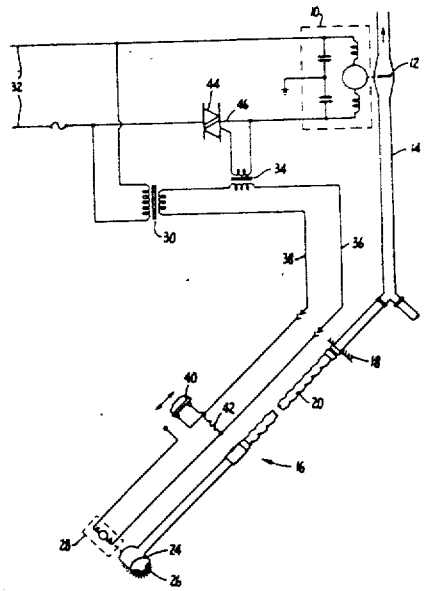

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claim 10 is confirmed.

Claims 1-6, 8 and 9 are cancelled.

Claim 7 is determined to be patentable as amended.

New claims 11-19 are added and determined to be patentable.

7. The control system claimed in claim [6] *12* wherein said first switching means comprises solenoid operated relay contracts and wherein said actuating means includes a semiconductor device coupled across said current detecting resistor and to the winding of said solenoid operated relay for actuating said relay in response to a voltage drop detected across said current detecting resistor.

*11. A control system for selectively energizing and supplying power to a central and a remote electrical load device interconnected by a single conductor pair from a common control located at the remote device comprising:*

*a. power means at the location of the central electrical device for providing electrical power to said central device and to the conductor pair interconnecting said central device with the remote electrical device, said power means providing D.C. electrical voltage to said conductor pair;*

*b. first switching means interposed between said power means and said central device for controlling the flow of electrical current to said central device;*

*c. second switching means at the location of said remote device and interposed in one conductor of said pair for controlling the flow of electrical current to said remote device, said second switching means comprising a double-throw switch having a first position for conducting electrical current to said remote electrical device and a second position for conducting electrical current through a shunting path that bypasses said remote device;*

*d. detecting means at the location of said central device and interposed in one conductor of said pair for detecting an electrical current flow through said conductor pair, said detecting means comprising a resistor interposed in one of said pair; and*

*e. actuating means responsive to said detecting means and coupled to said first switching means for actuating said first switching means in response to a current flow detected by said detecting means.*

*12. A control system for selectively energizing and supplying power to a central and remote electrical load device interconnected by a single conductor pair from a common control located at the remote device comprising:*

*a. power means at the location of the central electrical device for providing electrical power to said central device and to the conductor pair interconnecting said central device with the remote electrical device, said power means providing A.C. electrical voltage to said conductor pair;*

*b. first switching means interposed between said power means and said central device for controlling the flow of electrical current to said central device;*

*c. second switching means at the location of said remote device and interposed in one conductor of said pair for controlling the flow of electrical current to said remote device, said second switching means comprising a double-throw switch having a first position for conducting electrical current to said remote electrical device and a second position for conducting electrical current through a shunting path that bypasses said remote device;*

*d. detecting means at the location of said central device and interposed in one conductor of said pair for detecting an electrical current flow through said conductor pair, said detecting means comprising a current sensing transformer primary winding interposed in one of said pair;*

*e. actuating means responsive to said detecting means and coupled to said first switching means for actuating said first switching means in response to a current flow detected by said detecting means; and,*

*f. a voltage rectifier located in the circuit between said remote electrical device and said second switching means for supplying D.C. power to said remote device.*

*13. A control system for selectively energizing and supplying power to a central and remote electric load device interconnected by a single conductor pair which conducts a single current circuit only from a common control located at the remote device comprising:*

*a. power means at the location of the central electrical device for providing electrical power to said central device and electrical current for the single circuit of the conductor pair interconnecting said central device with the remote electrical device;*

*b. first switching means interposed between said power means and said central device for controlling the flow of electrical current to said central device;*

*c. second switching means at the location of said remote device and interposed in one conductor of said pair for controlling the flow of electrical current to said remote device;*

*d. a current sensor at the location of said central device and interposed in one conductor of said pair, said sensor generating a control voltage in response to a flow of current through said conductor pair; and*

*e. actuating means responsive to said current sensor and coupled to said first switching means for actuating said first switching means in response to the control voltage generated by said sensor.*

*14. The control circuit claimed in claim 13 wherein said second switching means comprises a double-throw switch having a first position for conducting electrical current to said remote electrical device and a second position for conducting electrical current through a shunting path that bypasses said remote device.*

*15. A power transmission and control system for a central vacuum cleaning system having a centrally located electrical vacuum motor and at least one remote cleaning unit to be coupled to the vacuum system and carrying an agitator brush driven by a motor, said system comprising:* a. a single pair of conductors conducting a single current circuit only and coupled to a source of electrical power at the location of the centrally located electric vacuum motor and to the agitator motor in the remote cleaning unit, said source of electric power providing electrical current for the single circuit of the conductors;

b. a double-throw switch positioned in the handle of said remote unit and coupled between one conductor of said pair and said agitator motor, one position of said switch for supplying electrical power to said motor and the second position of said switch for providing electrical continuity across said pair whereby said motor is shunted while current flows through said pair of conductors;

c. a current sensor at the location of said centrally located vacuum motor and interposed in one conductor of said pair, said sensor generating a control voltage in response to a flow of current through said conductor pair;

d. a power transmission line connecting said centrally located electrical vacuum motor to a source of electrical power; and, e. an electrically responsive power switch interposed in said power transmission line and coupled to said current sensor for actuation by the control voltage generated therein.

16. The system claimed in claim 15 wherein said current sensor comprises a transformer having the primary winding coupled into one conductor of said pair and wherein said power switch comprises a triac having the gate coupled to the secondary winding of said transformer.

17. A control system for selectively energizing and supplying power to a central and remote electrical load device interconnected by a single conductor pair which conducts a single current circuit only, from a common control located at the remote device comprising:

a. power means at the location of the central electrical device for providing electrical power to said central device and electrical current to the single circuit of the conductor pair interconnecting said central device with the remote electrical device, said power means providing A.C. electrical voltage to said conductor pair;

b. first switching means interposed between said power means and said central device for controlling the flow of electrical current to said central device;

c. second switching means at the location of said remote device and interposed in one conductor of said pair for controlling the flow of electrical current to said remote device, said second switching means comprising a double-throw switch having a first position for conducting electrical current to said remote electrical device and a second position for conducting electrical current through a shunting path that bypasses said remote device;

d. detecting means at the location of said central device and interposed in one conductor of said pair for detecting an electrical current flow through said conductor pair, said detecting means comprising a current sensing transformer primary winding interposed in one of said pair; and e. actuating means responsive to said detecting means and coupled to said first switching means for actuating said first switching means in response to a current flow detected by said detecting means.

18. The control system claimed in claim 17 wherein said first switching means comprises a triac and wherein said actuating means includes circuitry responsive to an electrical current sensed by said current sensing transformer primary winding for gating said triac into conduction.

19. A control system for selectively energizing and supplying power to a central and a remote electrical load device interconnected by a single conductor pair which conducts a single current circuit only, from a common control located at the remote device comprising:

a. power means at the location of the central electrical device for providing electrical A.C. power to said central device and electrical current for the single circuit of the conductor pair interconnecting said central device with the remote electrical device, said power means being connected to said conductor pair to provide A.C. power only to said conductor pair;

b. first switching means interposed between said power means and said central device for controlling the flow of electrical current to said central device;

c. second switching means at the location of said remote device and interposed in one conductor of said pair for controlling the flow of electrical current to said remote device;

d. detecting means at the location of said central device and interposed in one conductor of said pair for detecting an electrical current flow through said conductor pair; and e. actuating means responsive to said detecting means and coupled to said first switching means for actuating said first switching means in response to a current flow detected by said detecting means.

* * * * *